June 24, 1958  J. A. ALESI  2,839,786
COMPRESSION MOLDING APPARATUS
Filed April 12, 1955  3 Sheets-Sheet 1
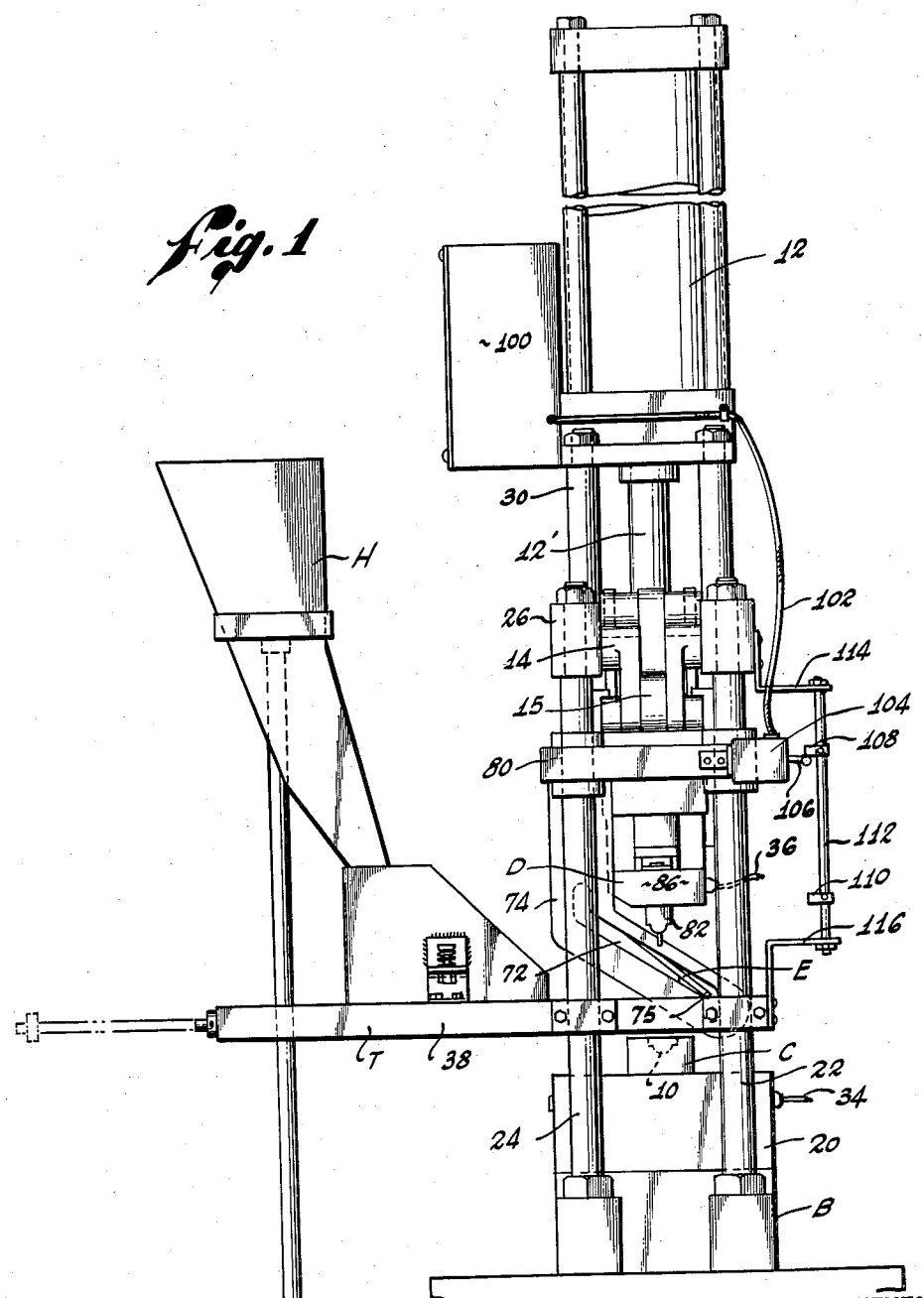
INVENTOR.
JOHN A. ALESI June 24, 1958   J. A. ALESI   2,839,786
COMPRESSION MOLDING APPARATUS
Filed April 12, 1955   3 Sheets-Sheet 2
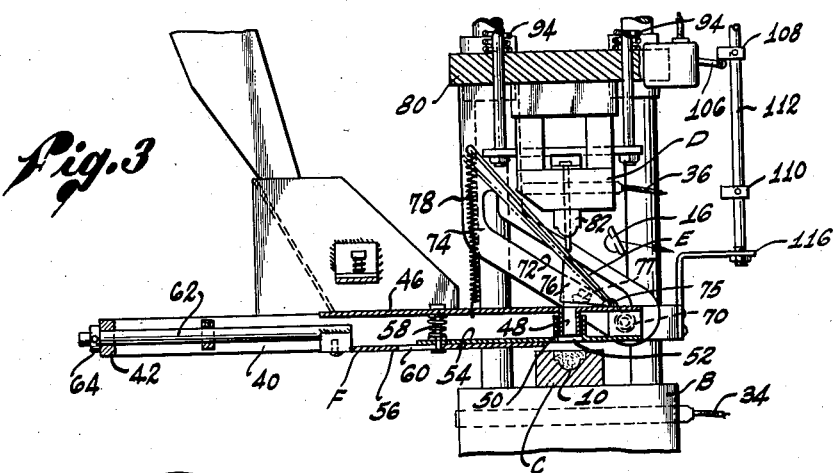
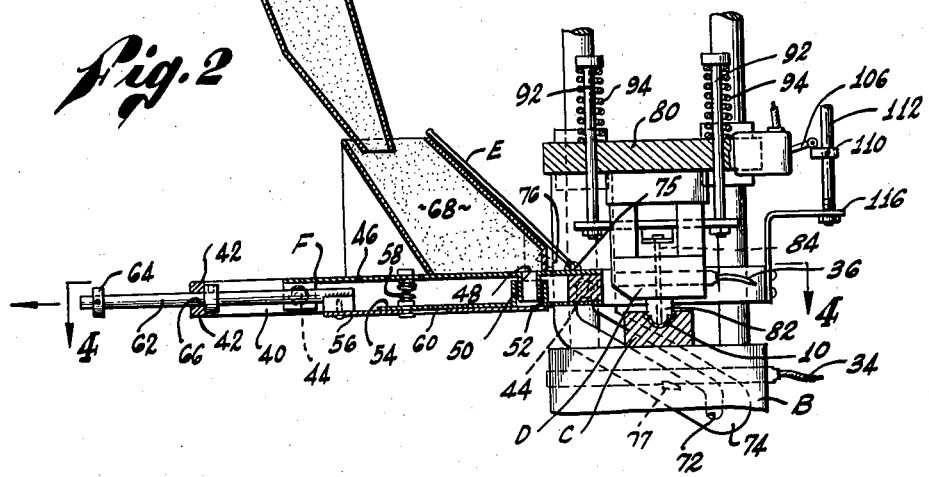
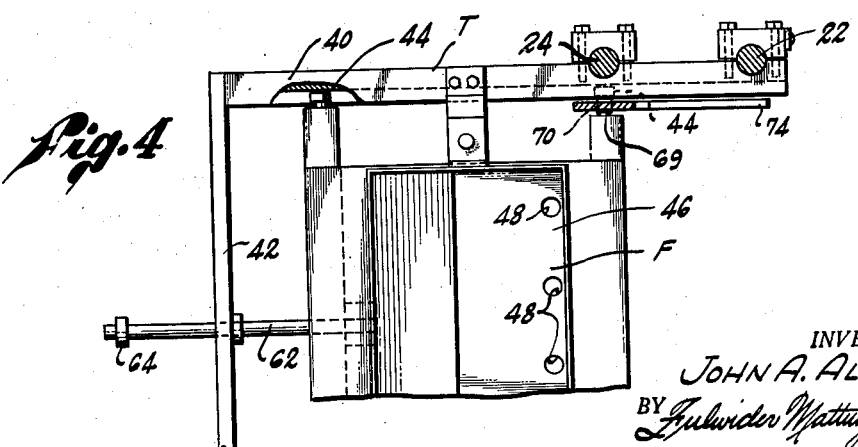
INVENTOR.
JOHN A. ALESI
BY Fulwider Mattingly & Huntley
Attorneys June 24, 1958 J. A. ALESI 2,839,786
COMPRESSION MOLDING APPARATUS
Filed April 12, 1955 3 Sheets-Sheet 3

INVENTOR.
JOHN A. ALESI
BY
Attorneys

United States Patent Office 2,839,786
Patented June 24, 1958

2,839,786

COMPRESSION MOLDING APPARATUS

John A. Alesi, West Los Angeles, Calif.

Application April 12, 1955, Serial No. 500,874

2 Claims. (Cl. 18—16)

The present invention relates generally to molding apparatus and more particularly to a new and improved form of compression molding apparatus especially adapted for use in molding powdered plastics.

The conventional types of compression molding apparatus heretofore proposed for use with powdered plastics generally include a bed member and a platen member mounted for reciprocal movement relative to the bed member. Such apparatus is hydraulically operated through a complex set of electro-hydraulic controls and is generally of heavy and costly construction. Additionally, such apparatus is difficult to maintain in operation because of the complexity of its control system. When a breakdown occurs a highly skilled mechanic is usually required to place it in working order. Other heretofore-proposed compression molding apparatus are air-operated and relative movement between the bed member and the platen member is effected through a rack and pinion connection. While this air-operated type of apparatus offers distinct advantages over the earlier hydraulically-operated types its cost is still comparatively high whereby many smaller businesses cannot afford its purchase and upkeep.

It is a major object of the present invention to provide a new and improved compression molding apparatus.

Another object of the invention is to provide a compression molding apparatus which utilizes a camming device for effecting relative movement between its bed and platen members.

A further object is to provide apparatus of this nature which is faster in operation than the heretofore-proposed types.

Yet another object of the invention is to provide a completely automatic compression molding apparatus which is simple of design having but a relatively few working parts whereby it may provide long periods of operation without requiring any attention from an operator other than periodic refilling of the powdered plastic utilized therewith.

An additional object is to provide compression molding apparatus which is comparatively light in weight whereby it may be readily transported from one location to another.

An important object of the invention is to provide compression molding apparatus which incorporates a unique safety mechanism for preventing damage to the apparatus should a molded piece fail to be properly ejected after a molding operation.

Another object is to provide compression molding apparatus which may be serviced by a semi-skilled mechanic and which does not require an operator having any special training.

It is yet another object of the invention to provide an automatic compression molding apparatus which may be constructed and maintained at lower cost than the heretofore-proposed compression molding apparatus having the same capacity.

These and other objects and advantages of the present invention will become apparent from the following detailed description of a preferred embodiment thereof, when taken in conjunction with the appended drawings, wherein:

Figure 1 is a side elevational view of a preferred form of compression molding apparatus embodying the present invention;

Figures 2 and 3 are vertical sectional views taken along line 2—2 of Figure 1 and showing the mode of operation of said apparatus;

Figure 4 is a horizontal sectional view taken on line 4—4 of Figure 2;

Figure 5:
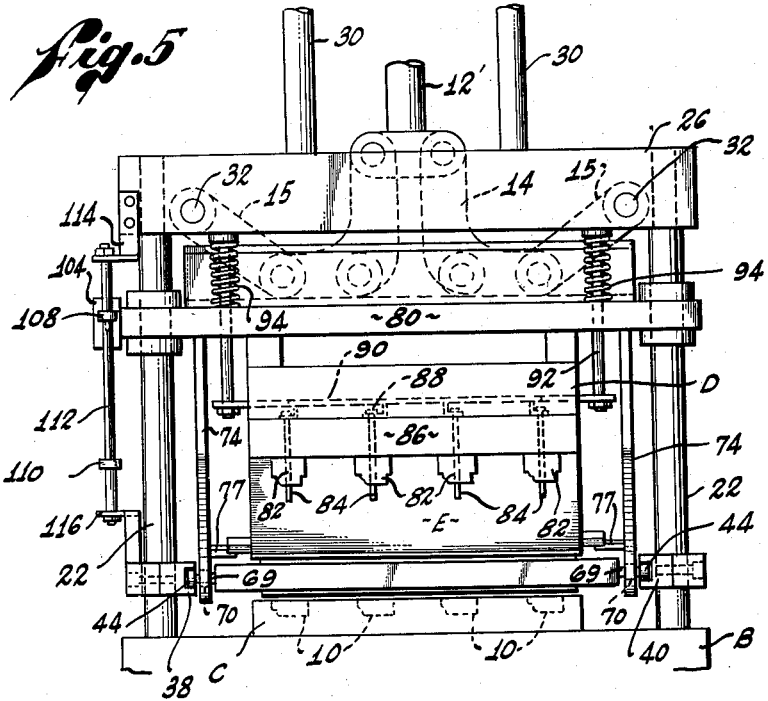
Figure 5 is a front elevational view showing the mid-portion of said apparatus.

Referring to the drawings, the preferred form of compression molding apparatus embodying the present invention broadly comprises a base B, mounting a mold carrier C formed at its upper portion with mold cavities 10, and a vertically reciprocal male die or core carrier D mounted above the mold carrier. The male die carrier D is moved in a vertical path towards and away from the mold carrier C by a pneumatic cylinder 12 and a piston (not shown) disposed therein. The piston is connected to the mold carrier by a rod 12' and a plurality of pivotally interconnected force-transfer links 14 and 15. A horizontal table T extending from one side of the base B rigidly mounts a hopper H containing powdered plastic material for charging the mold cavities 10. This table T also carries a horizontal movable feed tray F that is adapted to transfer plastic material from the hopper H into the mold cavities 10. This feed tray F carries an ejection chute E for receiving the molded pieces 16 as they are ejected from the mold cavities. The feed tray F and ejection chute E are adapted to be moved between their positions of Figures 2 and 3 during vertical reciprocation of the male die carrier D, in a manner to be more fully described hereinafter.

More particularly, and referring to Figures 1, 2 and 3, the base B includes a bed 20 which rigidly mounts a pair of upstanding front columns 22 and a pair of parallel rear columns 24. The upper ends of front columns 22 and 24 are rigidly interconnected by horizontal cross-pieces 26. Four legs 30 extend upwardly from the cross-pieces 26 so as to support the pneumatic cylinder 12. The outermost pair of links 15 are pivotally secured to the cross-pieces 26 by pivot pins 32. The mold carrier C is rigidly supported upon the bed 20 and is adapted to be heated by suitable electric heating elements receiving electric current through a conduit 34. The male die carrier D is likewise heated by suitable electric heating elements receiving electric current through a conduit 36. The table T is defined by a pair of horizontal channel-shaped rails 38 and 40 which are rigidly interconnected at their rear ends by a cross-piece 42.

As shown in Figures 2, 3 and 4, the feed tray F mounts a pair of rollers 44 at each of its sides. These rollers 44 are adapted to rotate within the rails 38 and 40 so as to permit horizontal movement of the feed tray relative to the table T. The upper plate 46 of the feed tray is formed with a row of aligned bores 48 from each of which depends a vertically extending tube 50. The lower end of these tubes 50 is aligned with a row of bores 52 formed in the lower plate 54 of the feed tray. As shown in Figure 2, the bores 52 are closed when the feed tray is in its retracted position by the front portion of a loading plate 56. The latter is horizontally slidably connected to the underside of the lower plate 54 by a plurality of posts 58, the lower portion of the latter being disposed in elongated slots 60 formed in the loading plate. The rear end of the loading plate 56 rigidly mounts a horizontal, rearwardly extending trip bar 62 having a bumper 64 secured to its rear end. The trip bar 62 is slidably disposed within a horizontal bore 66 formed in the mid-portion of the cross-piece 42. With this arrangement, when the feed tray F is disposed in its retracted position of Figure 2, the powdered plastic material 68 in the hopper H is free to flow into the tubes 50 in the proper quantity to fill the mold cavities 10. This powdered plastic material 68 will be retained in the tubes 50 by the front portion of the loading plate 56 until the feed tray F reaches its loading position of Figure 3. As the tray moves over the mold cavities 10, the bumper 64 of the trip bar 62 will engage the crosspiece 42 of the table T so as to stop further movement of the loading plate 56, or to the right in Figures 1 through 4. The lower end of the tubes 50 will accordingly be uncovered and the charges of powdered plastic material will fall into the mold cavities 10.

The front end of the feed tray F is formed with a pair of aligned shafts 69. The outer end of each shaft rotatably supports one of the rollers 44 while the intermediate portion thereof carries a cam wheel 70. These cam wheels 70 are each disposed within an elongated, downwardly and forwardly extending cam slot 72 formed in a pair of vertically extending plates 74 which rigidly depend from the lower end of the male die carrier D. With this arrangement, vertical movement of the male die carrier D will effect concurrent horizontal reciprocation of the feed tray F between its mold cavity-charging position of Figure 2 and its retracted position of Figure 3, the cam wheels 70 being moved forwardly relative to the cam slots 72 as the male die carrier D moves downwardly. When the male die carrier is again raised, the cam slot 72 will urge the cam wheels 70 rearwardly so as to retract the feed tray to the left in the drawings.

The ejection chute E is of flat configuration and is pivotally secured at its front end to the sides of the feed tray F by pins 75. It is normally maintained in an upwardly and rearwardly inclined position by means of a pair of triangular gusset plates 76 which are rigidly secured along their upper end to the front portion of the underside of the sides of the tray. The bottom side of these gusset plates 76 abut the upper surface of the charging tray M. As indicated in Figures 2 and 3, a button element 77 is formed on the opposed faces of the cam plates 74. These button elements 77 are adapted to engage the underside of the ejection chute E as the male die carrier D nears its uppermost position of Figure 3 and thereby pivot the upper end of the ejection chute upwardly from its dotted to its solid outline position of this figure. A tension spring 78 serves to return the ejection chute to its normal position when the feed tray F returns towards its retracted position. The purpose of this construction is set forth hereinafter.

The mold carrier C is shown as being formed with a single row of aligned mold cavities 10. Heretofore-proposed compression molding apparatus utilize a plurality of rows of mold cavities. The inventor has determined, however, that by utilizing solely a single row of mold cavities the molding operation may be speeded up considerably because of the shorter horizontal travel which may be undergone by the feed tray F.

The male die carrier D includes a flat main body 80 from which depends a row of aligned male die elements 82. A vertically extending ejection pin 84 is slidably disposed within each of the male die elements 82 with its upper portion being supported by a carrier block 86. The upper ends of the ejection pins 84 include heads 88 which are engaged by a retracting bar 90 disposed above the carrier block 86. The outer portions of the retraction bar 90 are secured to a pair of upwardly vertically extending posts 92. The upper ends of these posts 92 are slidably disposed within the main body 80, and are constantly biased downwardly by means of helical compression springs 94. With this arrangement, as the male die elements 82 move downwardly into the mold cavities 10, the ejection pins 84 are free to retract upwardly, as indicated in Figure 2. When the male die carrier D has been raised, however, to its position of Figure 3 the springs 94 will urge the ejection pins downwardly so as to eject the molded pieces 96 from the male die elements 82, the molded pieces 16 sticking to the male die elements 82 during an upstroke of the male die carrier. Should the molded pieces 16 continue to stick to the male die elements after the male die carrier D has reached its upper position, the engagement of the ejection chute E therewith will free the stuck pieces, as indicated in Figure 3. As also indicated in this figure, the ejection chute E serves to deflect the falling molded pieces 16 forwardly away from the apparatus and into a suitable receptacle (not shown). During the time the male die carrier D is in its raised position, the tubes 50 will be depositing another charge of powdered plastic material 68 within the mold cavities 10. Hence, when the male die carrier is again lowered another molding operation may take place.

Figure 6:
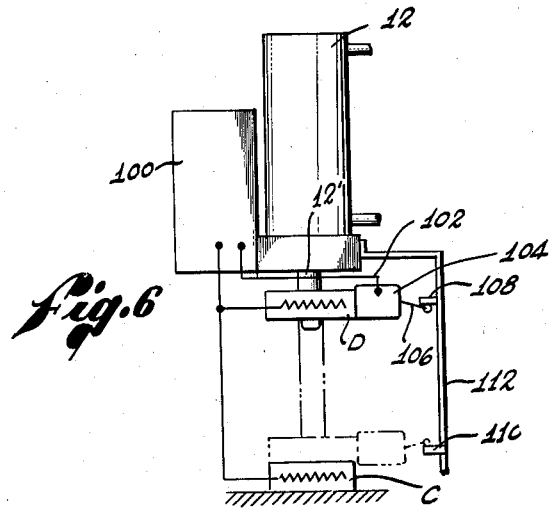
Figure 6 is a schematic diagram of said apparatus.

It should be particularly observed that it sometimes occurs that the molded pieces 16 will not be lifted from the mold cavities by its respective male die element 82. When this happens in a conventional compression molding apparatus a charge of powdered plastic will be deposited above the stuck molded piece on the mold carrier C and as the male die element 82 is urged into the mold cavity during the molding portion of the cycle, the male die element and/or the mold carrier may be seriously damaged. The present invention, however, incorporates unique means for preventing the occurrence of such damage. This means forms an integral part of the mechanism used to control the operation of the pneumatic cylinder 12. As shown in Figures 1 and 6, it includes an electric switching box 100 wherein is mounted suitable valving for introducing air into the cylinder 12 and thereby effecting the vertical reciprocation of the male die carrier D. A suitable timer is also mounted in the switching box 100 for controlling the time of each molding cycle. The switching box 100 is connected by a conduit 102 to a repeat cycle switch 104 that is secured to one side of the main body 80 of the male die carrier D. An actuating lever 106 extends forwardly from the repeat cycle switch 104 whereby it may engage upper and lower tripping elements 108 and 110, respectively, secured to a vertical bar 112. The latter is mounted between a pair of brackets 114 and 116 which are affixed to the frame of the base B. The spacing of the tripping elements 108 and 110 is so arranged that upward movement of the male die carrier D will cause the actuating lever 106 to engage and be pivoted downwardly by the upper tripping element 108 when the male die carrier has reached the upper end of its stroke. The repeat cycle switch 104 will thereby be tripped and the valves in the switching box 100 will cause the direction of movement of the male die carrier to be reversed. The latter will then move downwardly until the male die elements 82 reach a position just above the upper surface of the mold carrier C. At this time, the cycle will stop unless the actuating lever 106 engages and is pivoted upwardly by the lower tripping element 110.

It should be particularly noted that such pivotal movement of the actuating lever 106 is required to effect a restarting of the operating cycle. Unless the actuating lever is pivoted upwardly, the downward movement of the male die carrier D will stop at once, and accordingly the male die elements 82 will not enter the mold cavities 10 so as to effect a molding operation. This arrangement insures that should a molded piece 16 remain stuck in its mold cavity from the preceding cycle, the corresponding die element will engage the powdered plastic charge dumped on top of the stuck piece and thereby prevent the male die carrier D from moving downwardly the necessary distance for the actuating lever 106 to be pivoted upwardly by the lower tripping element 110. The cycle will then be ended at this point and the actual molding operation will not take place. In this manner, damage to the apparatus resulting from the insertion of the male die element into the blocked mold cavity will be avoided. The operator may then clean up the mold carrier and re-start the operation of the apparatus.

It will be apparent that various modifications and changes may be made with respect to the embodiment of the aforedescribed detailed description without departing from the spirit of the invention or the scope of the following claims.

I claim:

1. Compression molding apparatus, comprising: a base formed with a mold cavity; a male die carrier movable vertically toward and away from said base; a pair of horizontal rails extending from the rear of said base; a feed tray formed at its front end with a pair of sidewardly extending shafts; a roller and a cam wheel on each of said shafts; additional rollers mounted on each side of said feed tray, all of said rollers riding on said rails; a pair of vertical cam plates depending from said male die carrier, each of said plates being formed with a forwardly and downwardly inclined cam slot, said cam wheels being disposed within said slots so as to effect horizontal movement of said tray between its mold cavity charging position and its retracted position as said male die carrier travels vertically toward and away from said base; a normally downwardly and forwardly inclined ejection chute pivotally secured at its front end to the front portion of said feed tray; means interposed between said ejection chute and said feed tray for maintaining said chute in a normal position; means formed on said cam plates which abut said chute as said male die carrier rises towards its raised position so as to pivot the rear end of said chute upwardly relative to its normal position; and, resilient means interposed between said ejection chute and said feed tray for constantly biasing said chute towards its normal position.

2. Compression molding apparatus, comprising: a base formed with a mold cavity; a male die carrier member movable vertically towards and away from said base; a feed tray member operatively connected to said base for horizontal movement between a mold cavity charging position disposed in the vertical path followed by said male die carrier member and a retracted position displaced rearwardly of said path; vertically extending cam plate means affixed to one of said members and formed with a vertically inclined cam slot; cam wheel means secured to the other of said members and disposed in said slot so as to automatically effect horizontal movement of said tray member between its mold cavity charging position and its retracted position as said male die carrier member travels towards and away from said base; a normally downwardly and forwardly inclined ejection chute pivotally secured at its front end to the front portion of said feed tray member; means interposed between said ejection chute and said feed tray member for maintaining said chute in its normal position; means formed on said cam plate means which abut said chute as said male die carrier member rises towards its raised position so as to pivot the rear end of said chute upwardly relatively to its normal position; and resilient means interposed between said ejection chute and said feed tray member for constantly biasing the rear end of said chute downwardly towards its normal position.

References Cited in the file of this patent

UNITED STATES PATENTS

| | | |
|---|---|---|
| 1,982,576 | Derry | Nov. 27, 1934 |
| 2,054,476 | Derry et al. | Sept. 15, 1936 |
| 2,256,081 | Farley | Sept. 16, 1941 |
| 2,347,972 | Scott et al. | May 2, 1944 |
| 2,444,339 | Dinzl | June 29, 1948 |
| 2,640,401 | Comstock | June 2, 1953 |

FOREIGN PATENTS

| | | |
|---|---|---|
| 403,768 | Germany | Oct. 6, 1924 |